US012584732B2

(12) United States Patent
King

(10) Patent No.: US 12,584,732 B2
(45) Date of Patent: Mar. 24, 2026

(54) SYSTEM AND METHOD FOR CREATING PROTECTIVE FOOTBALL EQUIPMENT

(71) Applicant: Riddell, Inc., Des Plaines, IL (US)

(72) Inventor: Steven King, Powell, OH (US)

(73) Assignee: Riddell, Inc., Des Plaines, IL (US)

( * ) Notice: Subject to any disclaimer, the term of this patent is extended or adjusted under 35 U.S.C. 154(b) by 0 days.

(21) Appl. No.: 18/758,641

(22) Filed: Jun. 28, 2024

(65) Prior Publication Data

US 2024/0426598 A1 Dec. 26, 2024

Related U.S. Application Data

(63) Continuation of application No. 18/211,024, filed on Jun. 16, 2023, now Pat. No. 12,104,892, which is a continuation of application No. 14/874,101, filed on Oct. 2, 2015, now abandoned.

(51) Int. Cl.
*G01B 11/24* (2006.01)
*A42C 2/00* (2006.01)
*G01B 11/14* (2006.01)

(52) U.S. Cl.
CPC .............. *G01B 11/24* (2013.01); *A42C 2/007* (2013.01); *G01B 11/14* (2013.01)

(58) Field of Classification Search
CPC .......... G01B 11/24; G01B 11/14; A42C 2/007
See application file for complete search history.

(56) References Cited

U.S. PATENT DOCUMENTS

| | | | | | |
|---|---|---|---|---|---|
| 4,345,338 | A | * | 8/1982 | Frieder, Jr. ............. | A42B 3/124 |
| | | | | | 2/425 |
| 5,405,312 | A | * | 4/1995 | Jacobs ............... | A41D 13/0568 |
| | | | | | 128/892 |
| 6,178,556 | B1 | * | 1/2001 | Foreman ................ | A63B 71/08 |
| | | | | | 2/22 |

(Continued)

FOREIGN PATENT DOCUMENTS

WO WO-2013058978 A1 * 4/2013 ............. G01B 11/00
WO WO-2020072148 A1 * 4/2020 ............. G01B 11/24

*Primary Examiner* — Tajash D Patel
(74) *Attorney, Agent, or Firm* — Barnes & Thornburg LLP

(57) ABSTRACT

The present invention pertains to a system and method for creating a customized protective sports equipment, such as a football helmet or shoulder pad assembly, having improved fit for the player wearing the equipment. An electronic measuring device takes a 3D scan to obtain anatomical data and measurements of a person or player's head or torso region. The anatomical data and measurements are sent to a computer, which has software for processing the anatomical data and then evaluating that data against a set of distinct, predetermined dimensions of at least two of the same components. The component that has distinct, predetermined dimensions that best fit the anatomical data is selected for installation in the protective equipment. In this manner, a customized, player-specific selection of pre-manufactured components are used to assemble the protective equipment to be worn by the player. A multi-step process is employed to design and assemble the protective sports equipment which features stock components that have a set of predetermined dimensions, and are identified through a player-specific selection of the components.

31 Claims, 12 Drawing Sheets

(56)                References Cited

U.S. PATENT DOCUMENTS

| | | | |
|---|---|---|---|
| 7,003,803 B1* | 2/2006 | Lyden | A42B 3/08 |
| | | | 2/22 |
| 7,882,839 B2* | 2/2011 | Ambis, Jr. | A63B 71/085 |
| | | | 128/861 |
| 9,545,127 B1* | 1/2017 | Sandifer | A42B 3/121 |
| 10,780,338 B1* | 9/2020 | Bologna | A42C 2/002 |
| 10,948,898 B1* | 3/2021 | Pietrzak | A41H 3/04 |
| 11,525,906 B2* | 12/2022 | Kadambi | G06T 7/593 |
| 11,625,901 B2* | 4/2023 | Littlefield | B33Y 50/00 |
| | | | 425/135 |
| 11,712,615 B2* | 8/2023 | Bologna | A42B 3/125 |
| | | | 2/455 |
| 11,822,312 B2* | 11/2023 | Richardson | A41H 1/02 |
| 12,104,892 B2* | 10/2024 | King | G01B 11/14 |
| 2003/0208302 A1* | 11/2003 | Lemelson | G05B 19/19 |
| | | | 700/245 |
| 2004/0204904 A1* | 10/2004 | Ebisawa | A42C 3/06 |
| | | | 702/170 |
| 2005/0050617 A1* | 3/2005 | Moore, III | A42C 2/007 |
| | | | 2/410 |
| 2006/0101559 A1* | 5/2006 | Moore, III | A42C 2/007 |
| | | | 2/410 |
| 2006/0278501 A1* | 12/2006 | Sweazy | B07C 3/082 |
| | | | 198/890 |
| 2007/0245468 A1* | 10/2007 | Butler | A42B 3/145 |
| | | | 2/418 |
| 2009/0010285 A1* | 1/2009 | Dubois | G10K 15/046 |
| | | | 356/614 |
| 2009/0028679 A1* | 1/2009 | Smith | B60P 1/4421 |
| | | | 414/800 |
| 2011/0056004 A1* | 3/2011 | Landi | B29C 45/1671 |
| | | | 2/24 |
| 2011/0078888 A1* | 4/2011 | Horkey | A61F 2/5046 |
| | | | 156/60 |
| 2011/0203038 A1* | 8/2011 | Jones, Jr. | A42C 2/007 |
| | | | 264/442 |
| 2013/0211774 A1* | 8/2013 | Bentley | G01P 13/00 |
| | | | 702/145 |
| 2014/0201889 A1* | 7/2014 | Pietrzak | A42C 2/007 |
| | | | 2/410 |
| 2015/0157081 A1* | 6/2015 | Hyman | A42B 3/12 |
| | | | 2/413 |
| 2022/0400806 A1* | 12/2022 | Pietrzak | B33Y 10/00 |
| 2024/0180285 A1* | 6/2024 | Pietrzak | G05B 19/4099 |

* cited by examiner

| Football Helmet Sizing Chart | | | | | |
|---|---|---|---|---|---|
| Adult | | | | | |
| Size | S | M | L | XL | XXL |
| Hat Size | 6 1/8 - 6 3/4 | 6 1/2 - 7 | 7 - 7 1/2 | 7 1/4 - 7 1/2 | 7 1/2 - 7 3/4 |
| Circumference | 19 5/8 - 21 1/4 | 20 1/8 - 22 3/8 | 21 5/8 - 23 1/4 | 23 1/8 - 25 1/2 | 24 1/2 - 26 1/2 |
| Youth | | | | | |
| Size | S | M | L | XL | XXL |
| Hat Size | 6 3/8 - 6 5/8 | 6 5/8 - 6 7/8 | 6 7/8 - 7 1/8 | 7 1/8 - 7 3/8 | 7 3/8 - 7 1/2 |
| Circumference | 20 1/8 - 20 1/2 | 20 5/8 - 21 1/4 | 21 3/8 - 22 | 22 1/8 - 22 3/4 | 22 7/8 - 23 1/2 |

Football Helmet Size Chart　　　　　　　　　　　　　　　　CLOSE ✕
Image 2 of 2 (play slideshow)

Prior art - Source: http://www.dunhamssports.com/resource-center/football-helmet-size-chart/

Figure 1

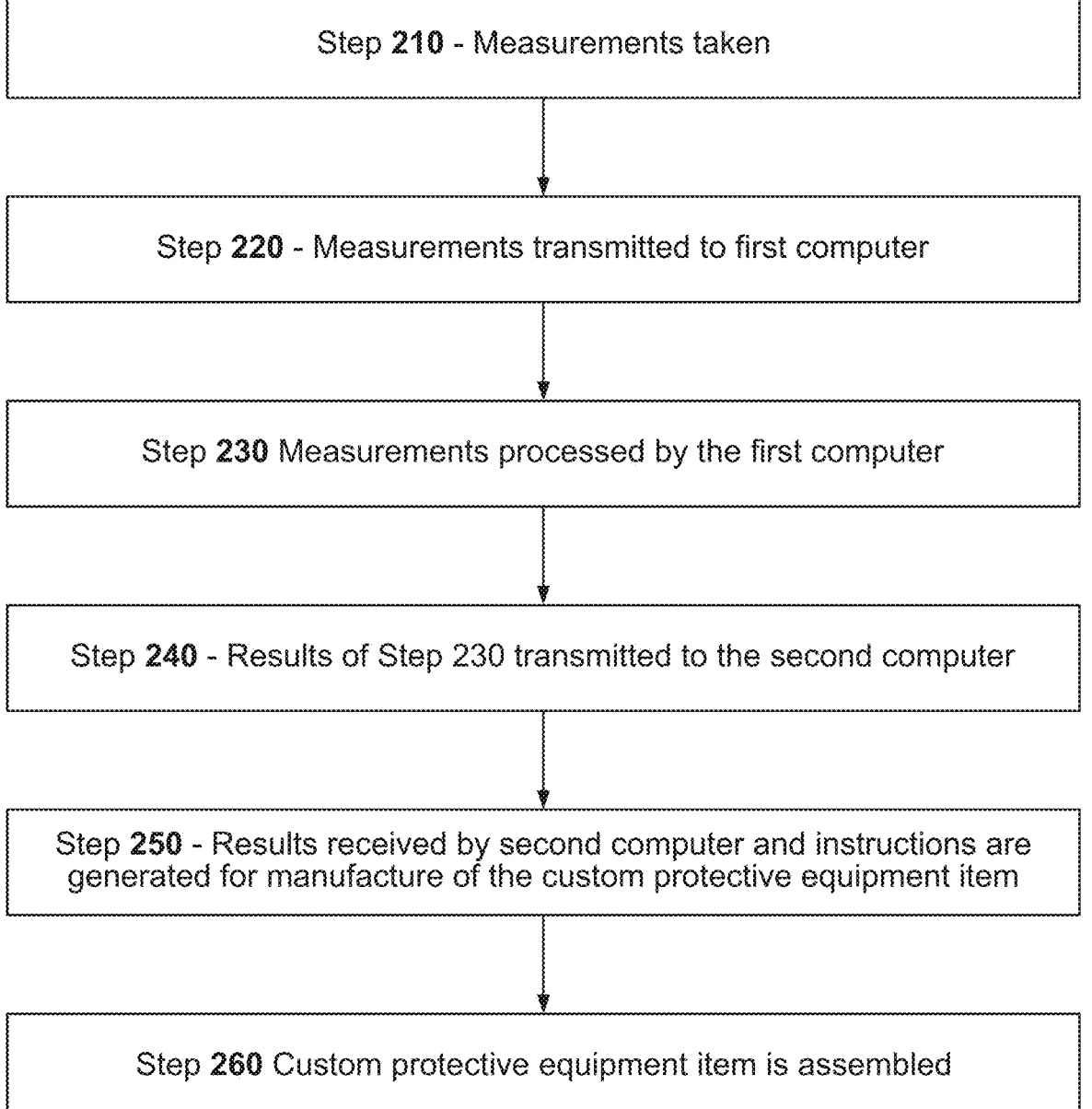

Step 210 - Measurements taken

Step 220 - Measurements transmitted to first computer

Step 230 Measurements processed by the first computer

Step 240 - Results of Step 230 transmitted to the second computer

Step 250 - Results received by second computer and instructions are generated for manufacture of the custom protective equipment item Step 260 Custom protective equipment item is assembled

SYSTEM AND METHOD FOR CREATING PROTECTIVE FOOTBALL EQUIPMENT

CROSS-REFERENCE TO RELATED APPLICATION

This application is a continuation of U.S. application Ser. No. 14/874,101 filed Oct. 2, 2015, and U.S. application Ser. No. 18/211,024, filed Jun. 16, 2023, the disclosures of which are hereby incorporated by reference herein as if fully restated.

TECHNICAL FIELD

Exemplary embodiments of the present invention relate generally to protective equipment, namely customized protective equipment.

BACKGROUND AND SUMMARY OF THE INVENTION

Protective equipment has long been used to guard the body against injury from dangerous activities. Police, firefighters, military personnel, and workers use protective equipment to guard them from injuries on the job. Likewise, athletes and other users employ protective equipment to guard themselves from injuries while playing sports or engaging in other recreational pursuits, including but not limited to, motorcyclists, bicyclists, skateboarders, rollerblades, skiers, rock climbers, and the like.

Protective equipment has long come in a series of standard sizes, such as XS, S, M, L, XL, and XXL. While users have generally been able to select the most comfortable or best fitting from these options, depending on availability, even the most comfortable or best fitting option may be ill suited for the person's body. The consequences of ill fitting protective equipment can be severe. Poorly fitted protective equipment can lead to equipment failure and under-protection for the wearer that can result in many kinds of injury. Further, poorly fitted equipment can be uncomfortable. Uncomfortable equipment by itself is undesirable. Further, uncomfortable equipment is less likely to be worn properly by a user, leaving them vulnerable to injury. For example, individuals who may have body physiques that fall outside the averages that protective equipment are generally built around are likely to find that their protective equipment does not fit well.[1]

[1] http://www.businessinsurance.com/article/20150104/NEWS08/301049992/ill-fitting-gear-poses-problem-for-women-working-safety-sensitive?tags=%7C92%7C304 ("Since more women are working in industries that require employees to wear personal protective equipment has spurred a larger discussion about ill-fitting gear, expects say.")

Properly fitting protective equipment is difficult. Standard sizes often force the person to select a "least common denominator" option. That is, the user will likely be forced to select the standard size which fits their largest applicable dimension. For example without limitation, if the user had temple-to-temple size that matched a large (L) helmet, but a forehead to back-of-head measurement that matched a medium (M) helmet, the user would likely be forced to choose the large size to accommodate the largest of the two dimensions. This selection, however, would leave the user with a gap between his forehead and the inner surface of the helmet and the back of his head and the inner surface of the helmet. In a collision, this could critically reduce the effectiveness of the helmet. A head injury is far more likely when a gap exists between the user's head and the inner surface of the helmet.[2]

[2] http:michaelgleibermd.com/news/role-football-helmets-concussion-prevention/ ("[S]tudies have shown that a properly-fitted helmet could potentially reduce the risk of a concussion by about 20% . . . the helmet should fit snugly, and there should be no space between the helmet's pads and the wear's head.")

As another example, without limitation, an individual may have one shoulder that rests slightly higher than the other. This may necessitate additional padding under the lower-resting shoulder such that the shoulder pad fits comfortably and evenly on the user. This may prevent the shoulder pad from otherwise unevenly distributing the forces of a collision across one, instead of both, shoulders.

Therefore, it would be desirable to provide a system and method for creating customized fit protective equipment. Such a system and method would provide accurate fitting, comfortable equipment which will lessen the risk of injury.

Exemplary embodiments of the present invention are directed to a system and method to provide customized protective equipment. Exemplary embodiments include a system and method whereby a user's body, or individual body parts, is scanned by a measurement system, such as a three-dimensional ("3D") imaging system. The data is then stored and analyzed to extract various dimensions needed to create the protective equipment item. The dimensions may be used to create a completely custom piece of protective equipment. Alternatively, the dimensions may be processed through an algorithm to select a series of components of various standard sizes that are assembled to create the custom protective equipment item of the present invention. To help illustrate, but not to serve as a limitation, an extra-large set of outer shoulder pads may be selected and assembled with an L size inner right shoulder pad insert and an M inner left shoulder pad insert to best fit an athlete with uneven or different size shoulders.

In other situations, a user may have a temporary condition that results in a need for an irregularly shaped protective equipment item. For example, but without limitation, to protect a contusion or to accommodate a brace, support, or other medical device. The present invention can take such a condition into account in creating a custom fit pad.

Once the proper sizes are selected, the results may be transmitted to a manufacture. A computer at the manufacturer may receive the instructions and create assembly instructions to create the custom fit protective equipment item. In other exemplary embodiments of the present invention, the measurements may be sent to the manufacturer, where they are then downloaded and processed through the algorithm and used to create a completely custom piece of protective equipment. Robots or other automated means of assembly may be utilized to create custom protective equipment item. The result is a better-fitting protective equipment item that is comfortable and reduces injuries.

The applications of this invention are numerous and will be apparent to those skilled in the art. For example, but not to serve as a limitation, the present invention may be used to create customized athletic protective equipment. In other exemplary applications, the present invention may be used to create protective equipment for the workplace. In still other exemplary applications, the present invention may be used to create custom protective equipment for recreational pursuits. Within these applications, without limitation, the present invention may be used to create custom protective equipment for any body part.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is a prior art sizing chart guide for football helmets;

FIG. 3A is a flow chart describing the steps illustrated in FIG. 3;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

FIG. 1 is a prior art sizing chart for football helmets.[3] This demonstrates how prior art protective equipment items, such as football helmets, are generally sized. While this example discusses football helmets, as previously mentioned, this is merely exemplary and not intended to the limiting. Any type of protective equipment for any application is contemplated. A single measurement, such as head circumference is used to give a size, generally XS, S, M, L, XL, and XXL. As previously discussed, this forces users to select the smallest size that still fits their largest dimension. For example, without limitation, if a person has a larger forehead but a smaller jaw structure, they may have to choose a larger size helmet that leaves extra space in the jaw and cheek area, exposing them to injury. Further, the user may be less likely to wear such an ill-fitting helmet properly as it may shift frequently during use.

[3] http://www.dunhamssports.com/resource-center/football-helmet-size-chart/

Figure 2:
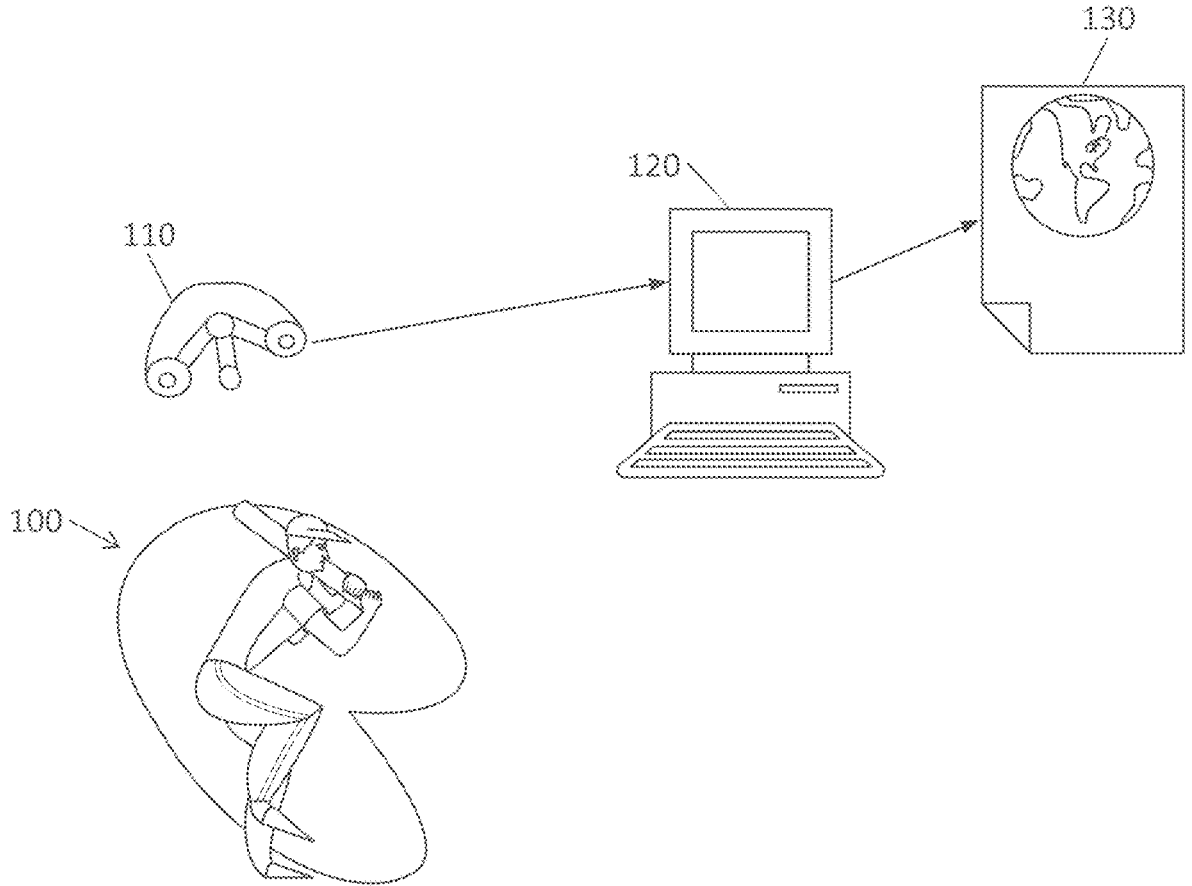
FIG. 2 illustrates an exemplary measurement process in accordance with the present invention.

FIG. 2 illustrates an exemplary measurement process in accordance with the present invention. A measuring device 110 is used to measure the contours and distances of a person's 100 body or body parts. In exemplary embodiment of the present invention, measurements are taken of a person 100 by use of a 3D scanner. Any other measuring device, including but not limited to, a tape measure, calipers, and the like are contemplated.

As will be described in greater detail in subsequent figures, the results of the measuring device 110 are utilized to create a custom piece of protective equipment 160 for the person 100. The custom protective equipment 160 may include athletic protective equipment for athletes, or other protective equipment for recreational or professional users. For example, without limitation, this may include athletic equipment (e.g., football pads, lacrosse pads, hockey pads, soccer pads) or other professional or recreational personal protective equipment (e.g., knee pads, back braces, ankle braces, elbow pads, helmets).

For example without limitation, if taking the measurements of the user's head to create a custom helmet, measurements such as temple to temple, forehead circumference, forehead to back-of-skull, ear to ear, cheekbone to cheekbone, and chin to top-of-head, and the like, may be taken. Specific measurements may be taken as required and any such measurements are contemplated. These measurements may be recorded in a computer 120. Other storage devices, including but not limited to hand written documentation, are also contemplated. As will be explained in greater detail in subsequent figures, these results may be processed by the computer 120 to generate a set of results. These results may be used to create a custom protective equipment item 160. Optionally, these results may be uploaded to the internet 130.

Figure 3:
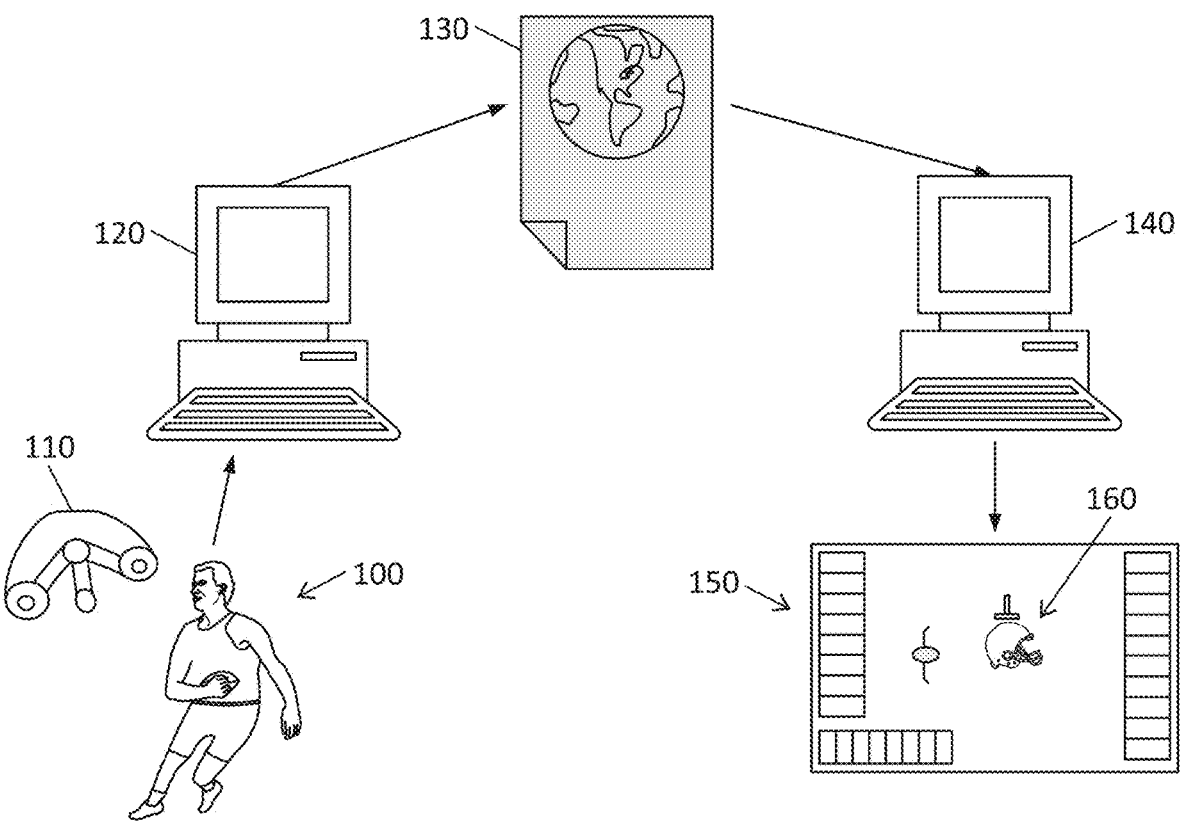
FIG. 3 illustrates an exemplary customization process, including the exemplary measurement process shown in FIG. 2.

FIG. 3 illustrates an exemplary customization process, which includes the exemplary measurement process of FIG. 2. The results stored in the computer 120 may be transmitted to a second computer 140, which in exemplary embodiments of the present inventions is located at a manufacturer. In exemplary embodiments of the present invention, this transmission is accomplished via the internet 130. However, any other transmission means are contemplated, including storing the information on a disk, flash drive, portable hard drive, cloud storage, wired connection, intranet, Ethernet, print out, hand written documentation, and the like. The results may be used by the second computer 140 to generate instructions that control a manufacturing process 150 to create the custom protective equipment item 160.

FIG. 3A is a flow chart describing the steps illustrated in FIG. 3. In step 210, measurements may be taken of the person 100, such as by use of the measuring device 110 as discussed in FIG. 2 and FIG. 3. In step 220, the measurements may be sent automatically to the first computer 120. This transmission may be accomplished by a wired or wireless connection. Alternatively, the measurement may be entered into the computer manually.

In step 230, the first computer 120 may process the measurements by use of an algorithm to generate results used to create an entirely custom protective equipment item 160 for the user 100. In other exemplary embodiments of the present invention, the first computer 120 may process the measurements by use of an algorithm to generate a selection of the best fitting combination of standard size components (e.g., individual pads within an overall protective equipment article such as a helmet) to create the custom protective equipment item 160. For example, without limitation, the results may include a selection of an outer shell 310 and a series of inner pads 320, 330, 340, 350, and 360. As will be explained in greater detail in subsequent figures, these selections may include size, style, material, orientation, placement location, thickness, shape, and the like of components that assemble to create the protective equipment item 160. In other exemplary embodiments of the present invention, the algorithm may be processed on the second computer 140 or any other computer.

In step 240 the results of step 230 may be transmitted to the second computer 140. This transmission may be accomplished via the internet 130, cloud storage, physical transfer, or the like. The second computer 140 may be located at a manufacturer of the custom protective equipment item 160, though any location is contemplated. In step 250 the second computer 140 may generate instructions for the assembly of the protective equipment item 160, which occurs at step 260. As will be discussed in greater detail in subsequent figures the assembly may be done manually or by an automated system. Any necessary instructions to control such an assembly process are contemplated, including but not limited to, computer instructions to control a machine or print out instructions to direct a human worker.

Figure 4:
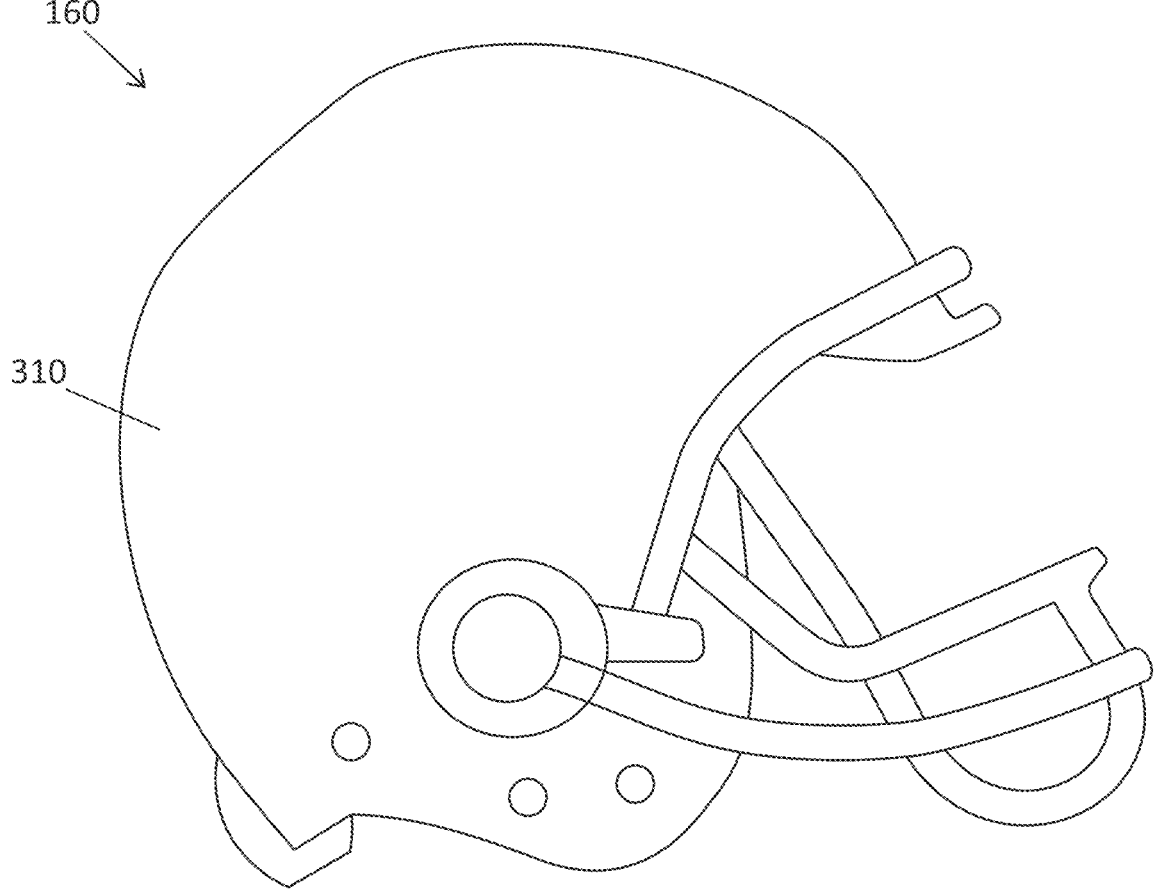
FIG. 4 is a side view of an exemplary protective equipment item in the form of a football helmet, in accordance with an exemplary embodiment of the present invention.
Figure 6:
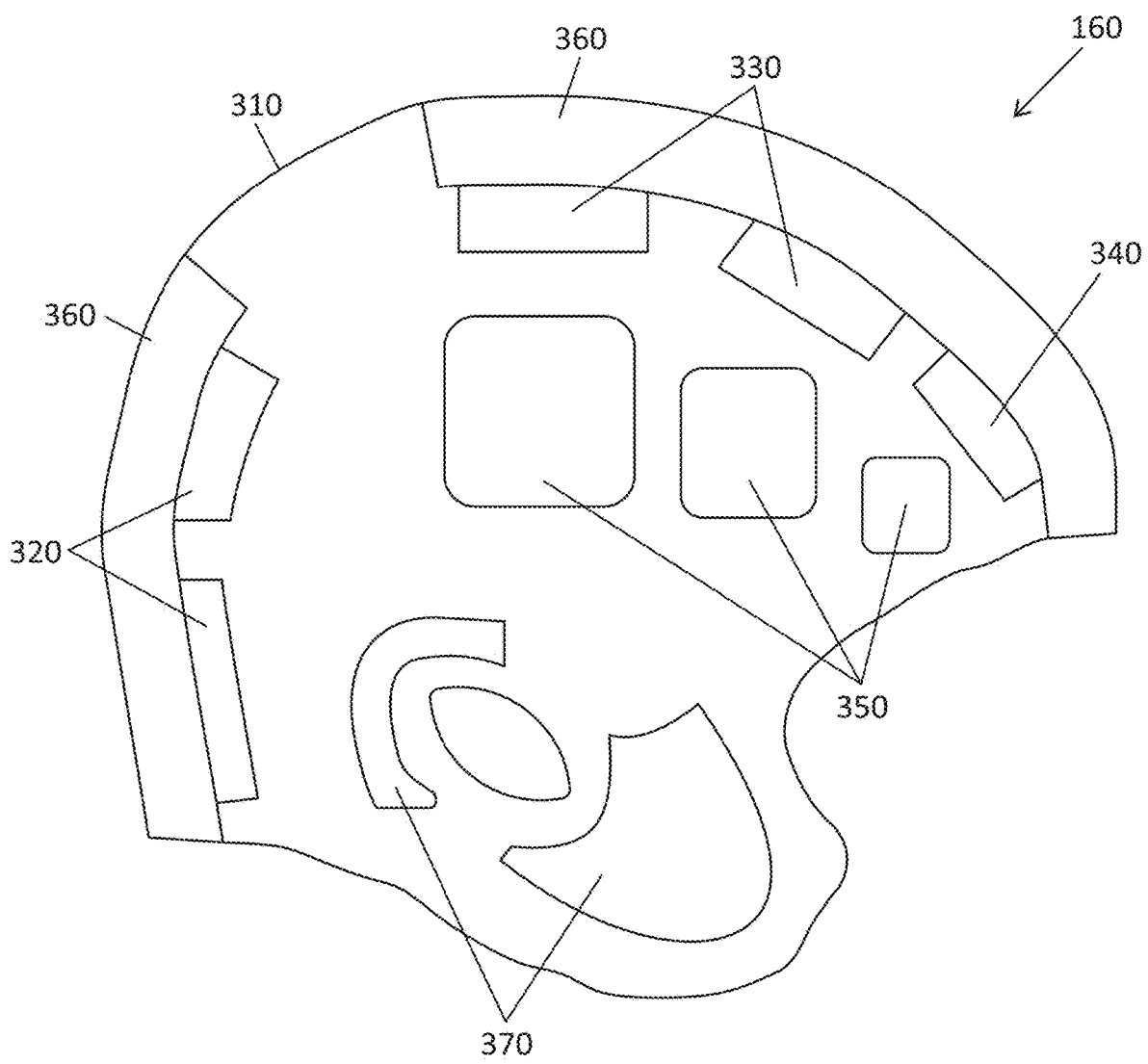
FIG. 6 is a side cross-sectional view of the football helmet of FIG. 4 illustrating another exemplary inner pad arrangement.

FIG. 4 though FIG. 6 illustrate a protective equipment item 160 in the form of a football helmet in accordance with an exemplary embodiment of the present invention. It is notable that the present helmet embodiment is merely exemplary, and the present invention applies to all kinds of protective equipment items. This includes, but is not limited to, chest pads, arm pads, shoulder pads, elbow pads, wrist guards, gloves, rib pads, hip pads, thigh pads, knee pads, shin pads, ankle pads, shoe inserts, foot pads, the like, and combinations thereof. This also includes, but is not limited to, pads adopted to protect from injury related to any athletic, recreational, or professional endeavor. For example, without limitation, the exemplary helmet could be a construction helmet, firefighter helmet, or a motorcycle helmet. As a further example, without limitation, the protective equipment may be a set of wrist guards adapted to be used for a recreational snowboarding.

Figure 5:
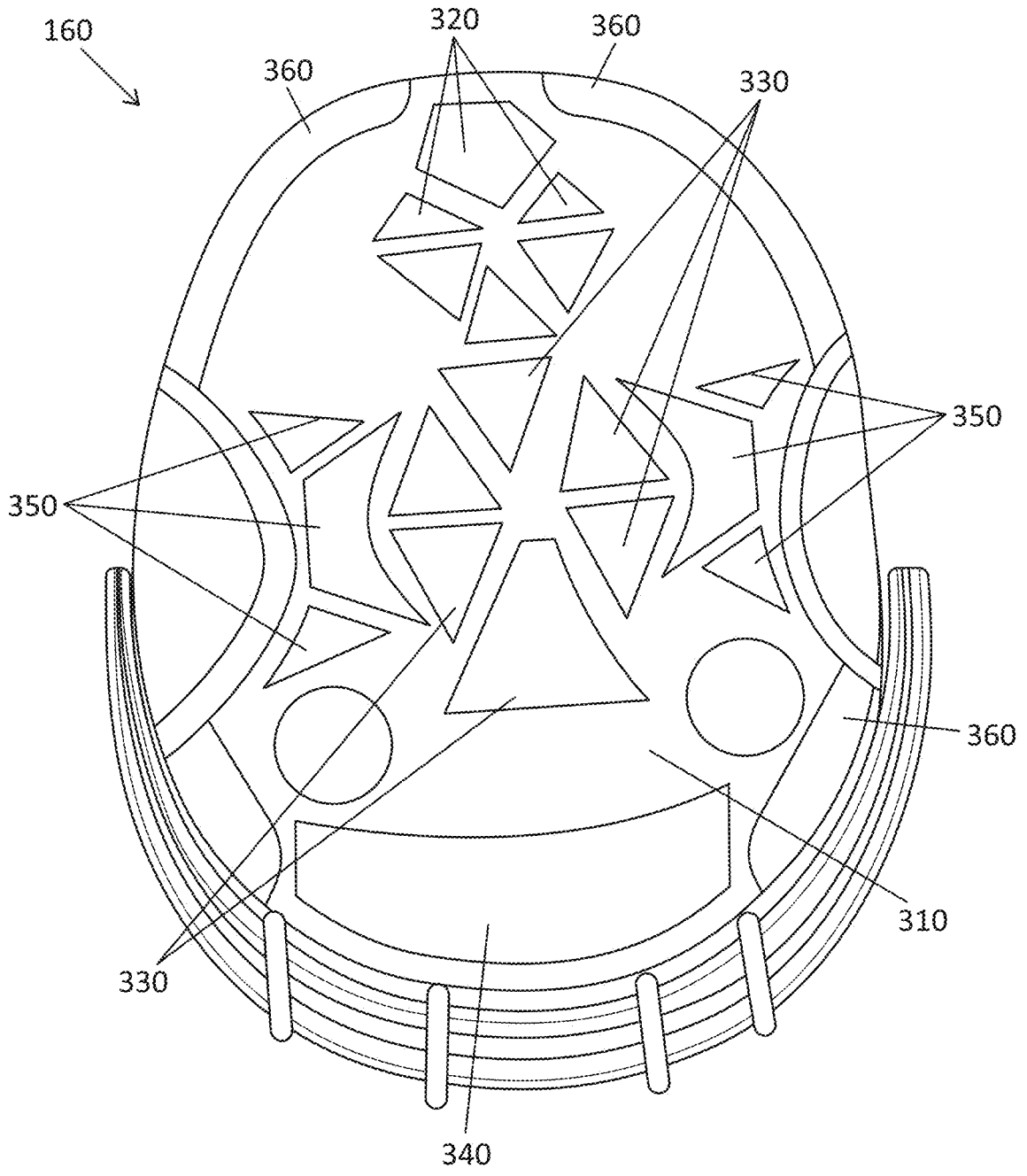
FIG. 5 is a bottom view of the football helmet of FIG. 4 illustrating an exemplary inner pad arrangement.

As best illustrated in FIG. 5 and FIG. 6, the exemplary helmet comprises a rigid outer shell 310 and a set of pads 320, 330, 340, 350, 360, and 370 that line the interior of the protective sports equipment 160. Said pads 320, 330, 340, 350, 360, and 370 may be of various thicknesses, sizes/ dimensions, orientations, materials, and styles. Said pads 320, 330, 340, 350, 360, and 370 may be configured to fit within the more rigid outer shell 310 and are used to provide shock protection as well as a secure fit. The distance between the pads and the user is critical to providing a "best fit" for the set of pads, that also improves the comfort and injury protection as well as a comfortable fit.

In the present embodiment of a helmet, the pads 320, 330, 340, 350, 360, and 370 may include top pads such as pads 330, forehead pads such as pads 340, rear pads such as pads 320, and side pads such as pads 350 and 370. These pads 320, 330, 340, 350, 360, and 370 are merely intended to serve as an illustration and are not intended to be limiting. As previously discussed, the present invention may be used with protective equipment for many different activities, and thus the number, size, orientation, location, and type of pads utilized may be different for each activity. Additionally, in exemplary embodiments of the present invention, multiple layers of pads, such as pads 360 and 320, may be used between the outer shell 310 and the user 100. For example, within the helmet, a medium size outer shell may be used with a large forehead pad, medium ear pads, and small pads for the remainder.

Figure 7:
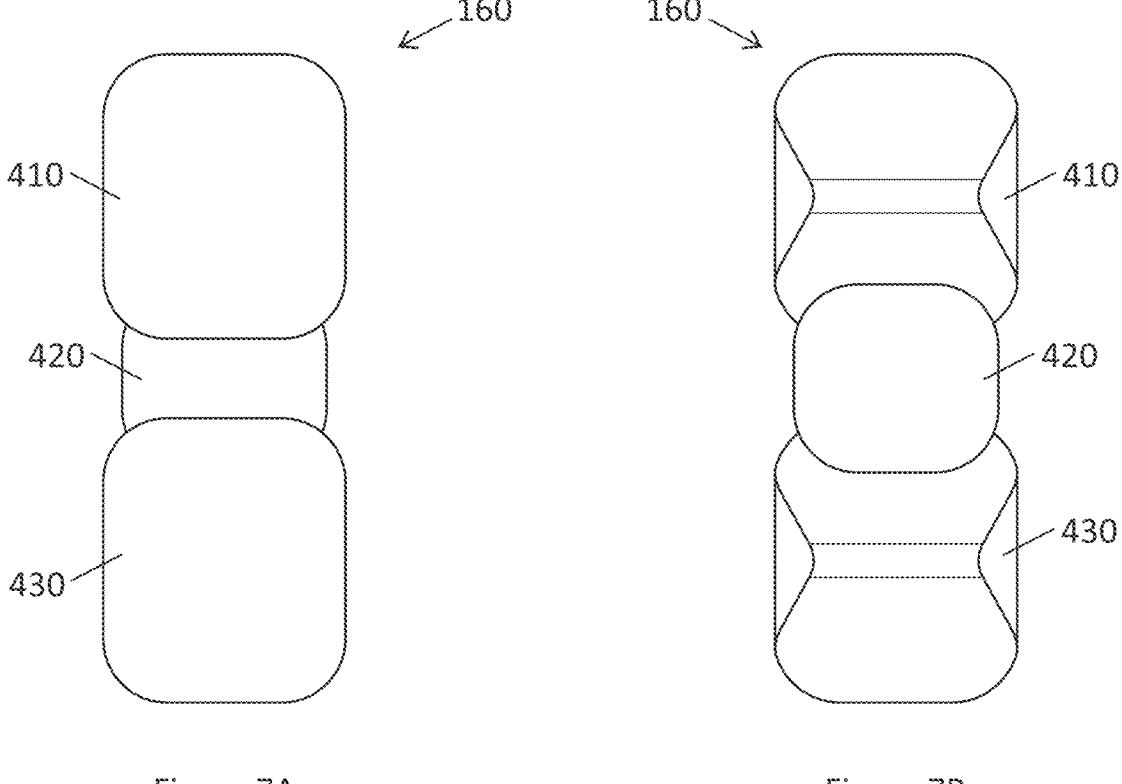
FIG. 7A illustrates a front view of an exemplary protective equipment item in the form of a lacrosse elbow pad, in accordance with an exemplary embodiment of the present invention.
FIG. 7B is a rear view of the exemplary lacrosse elbow pad of FIG. 7A.

As an additional example, the custom protective equipment item 160 may be a custom elbow pad for lacrosse, such as illustrated in FIG. 7A and FIG. 7B. To create such an item, a scan of an athlete's arm may be taken. Measurements such as wrist to elbow, elbow circumference, forearm circumference, elbow to bicep, and bicep circumference may be taken. A customized combination may be utilized to fit the upper pad 410, middle pad 420, and lower pad 430, to the athlete's arm. For example, without limitation, a large upper pad 410, may be utilized with a medium middle pad 420, and a small lower pad 430.

In other exemplary embodiments of the present invention, the custom protective equipment item 160 and its individual pieces may be entirely custom created to fit the user's needs, preferences, and body contour. In still other exemplary embodiments of the present invention, measurements may be taken to fit a pad to a temporary condition. For example, but without limitation, if the user is injured with a sever contusion, the custom protective equipment item 160 may be measured to fit over the swollen area such as to protect the area without placing pressure on it. As a further example, if the user has a medical device, such as a pacemaker, cochlear implant, or an insulin pump, the custom protective equipment item 160 may be measured to fit over the device so as to protect the area without placing pressure on it.

Figure 8:
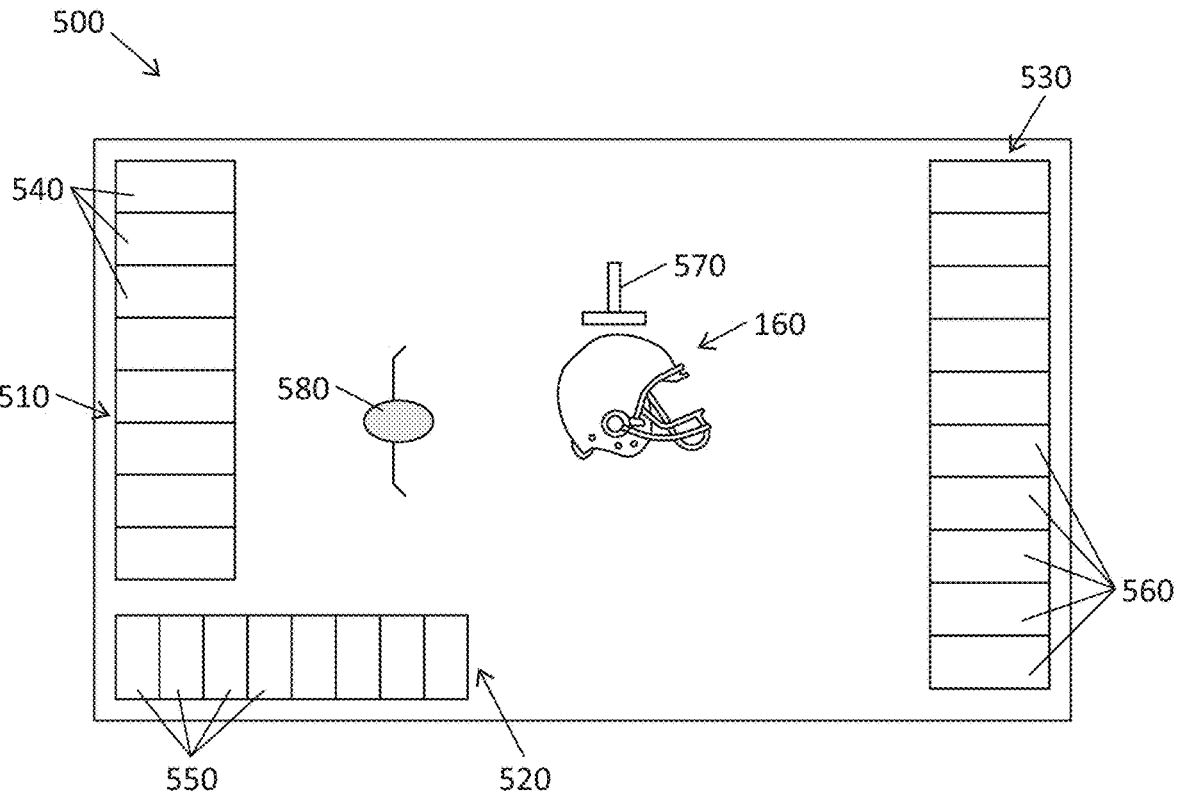
FIG. 8 is a of a top plan view of an exemplary embodiment of a customization process in accordance with the present invention.

FIG. 8 is an illustration of a top plan view of an exemplary assembly system in accordance with the present invention. In the present embodiment, a protective equipment item 160 may be placed in a fixture 570. It is notable that while the present figure illustrates the protective equipment item 160 as a helmet, as previously mentioned, any protective equipment item 160 is contemplated for any use and any body part. The fixture 570 may be any device configured to temporarily secure the protective equipment item 160 in position. The type of fixture 570 may be different for different types of protective equipment items 160, and any such fixture 570 is contemplated. The fixture 570 may be surrounded by a number of bins 510, 520, 530. Each bin 510, 520, 530 may comprise a number of compartments 540, 550, and 560. Each bin 510, 520, 530 may be limited to a particular pad 320, 330, 340, 350, 360, and 370. The particular pad 320, 330, 340, 350, 360, and 370 may be organized into the various compartments 540, 550, and 560 based on various sizes, types, styles, or the like. Thus each sizes, types, styles, or the like of each pad 320, 330, 340, 350, 360, and 370 is placed into the corresponding individual compartment 540, 550, and 560 of said bin 510, 520, 530. For example, without limitation, one of said bins 510 may be dedicated to forehead pads 340. The various compartments 540 may subdivide said bin 510 such that the first compartment contains a number of large forehead pads 340 of a first material, the second compartment contains a number of large forehead pads 340 of a second material, the third compartment contains a number of medium forehead pads 340 of the first material type, the fourth compartment contains a number of medium forehead pads 340 of the second material type, and so on. Any number of bins 510, 520, 530 having any number of compartments 540, 550, and 560 for any number or type of pads 320, 330, 340, 350, 360, and 370 are contemplated.

A robot 580 may receive instructions for the assembly of the protective equipment item 160 from the second computer 140 as best described in the discussion relating to FIG. 3 and FIG. 3A. In exemplary embodiments of the present invention, the robot 580 is an industrial type robot capable of grabbing and articulating small individual pieces, though any type of robot 580 is contemplated. The protective equipment item 160 may be placed in the fixture 570, and the robot 580 may travel from bin to bin 510, 520, and 530. At each bin 510, 520, and 530 the robot 580 may select the proper size, type, style, or the like, of a particular pad 320, 330, 340, 350, 360, and 370 from each compartment 540, 550, and 560 of the bin 510, 520, and 530. Thereafter, the robot 580 may take the pad 320, 330, 340, 350, 360, and 370 and secure it in the protective equipment item 160. This process may be repeated until all pads 320, 330, 340, 350, 360, and 370 are placed in the protective equipment item 160.

Figure 9:
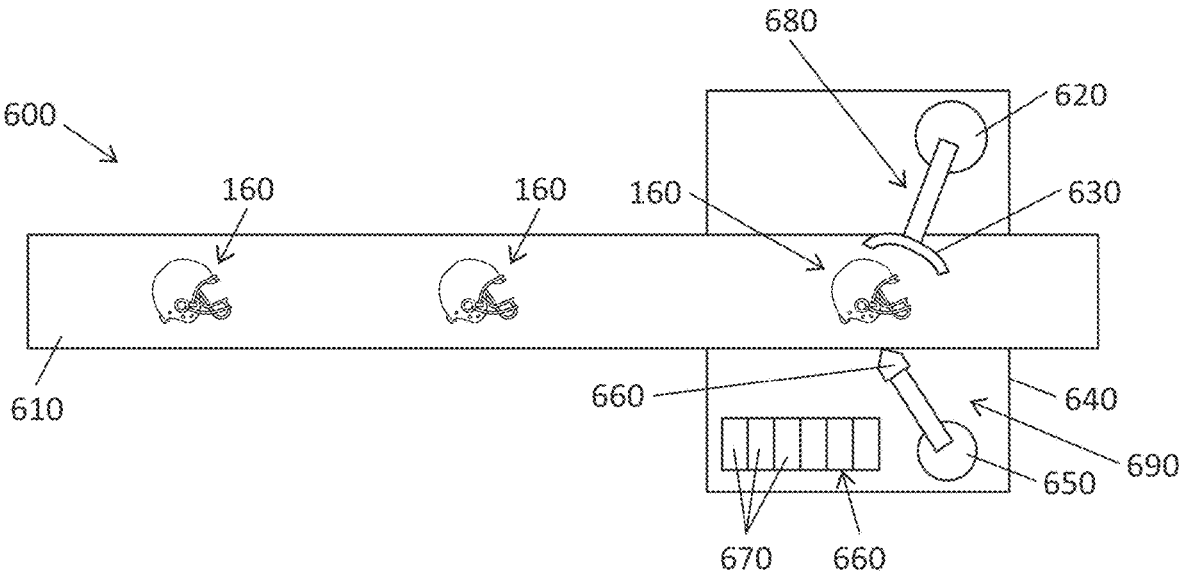
FIG. 9 is a of a top plan view of another exemplary embodiment of the customization process in accordance with the present invention.

FIG. 9 is an illustration of a top plan view of another exemplary assembly process in accordance with the present invention. Again, it is notable that while the present figure illustrates the protective equipment item 160 as a helmet, as previously mentioned, any protective equipment item 160 is contemplated for any use and any body part. A number of protective equipment items 160, may travel down an assembly line 610, such as by a conveyor belt. The assembly line 610 may pass through or terminate at an assembly area 640. The assembly area 640 may comprise a grabber robot 680 and an assembly robot 690. The grabber robot 680 and the assembly robot 690 may be pivotally mounted to a base section 620 and 650, respectively. In exemplary embodiments of the present invention, the grabber robot 680 and an assembly robot 690 are industrial type robots capable of grabbing and articulating small individual pieces, though any type of robots 680 and 690 are contemplated. The protective equipment item 160 may reach the grabber robot 580. The grabber robot 580 may utilize a grabbing fixture 630 to secure the protective equipment item 160. The assembly robot 690 may then select the correct custom insert pad combination, as instructed by the second computer 140. The placement robot 690 may select the proper combination of pads 320, 330, 340, 350, 360, and 370 from a bin 660 having a number of compartments 670 that subdivide said bin 660. The placement robot 690 may work with the grabber robot 680 to secure said pads 320, 330, 340, 350, 360, and 370 inside the protective equipment item 160. The assembly robot 690 may secure the pads 320, 330, 340, 350, 360, and 370 by use of adhesive, fasteners, or the like. Any number of bins 660 having any number of compartments 670 for any number of pads 320, 330, 340, 350, 360, and 370 are contemplated.

Figure 10:
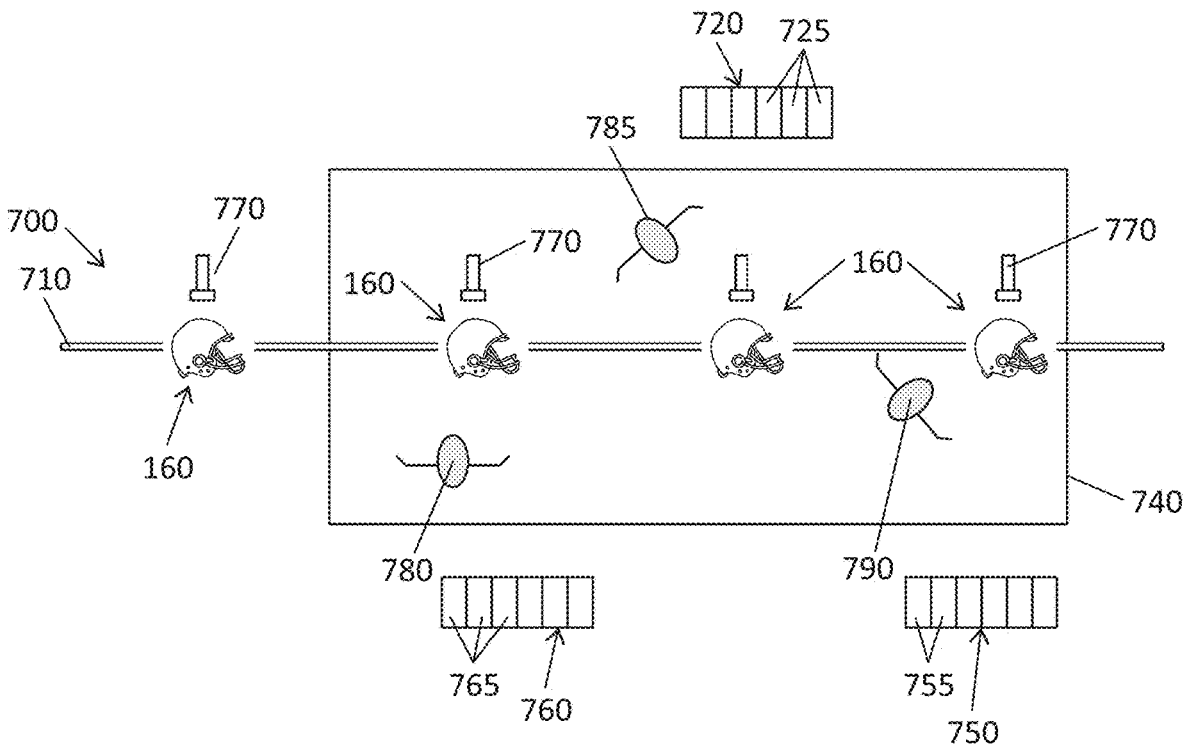
FIG. 10 illustrates a of a top plan view of another exemplary embodiment of the customization process in accordance with the present invention.

FIG. 10 is an illustration of a top plan view of another exemplary embodiment of an assembly process in accordance with the present invention. In such an embodiment, a protective equipment item 160 may travel down an assembly line 710, by use of a series of fixtures 770 that temporarily secure and transport the protective equipment item 160. In exemplary embodiments of the present invention the fixtures 770 are hangers, though any type of fixture is contemplated. As the protective equipment item 160 travels, it may encounter a number of robots 780, 785, and 790. The robots 780, 785, and 790 may select a predetermined insert pad 320, 330, 340, 350, 360, and 370 from one of a number of bins 720, 750, and 760 as instructed by the second computer 140. Each robot 780, 785, and 790 may grab a pad 320, 330, 340, 350, 360, and 370 from each bin 720, 750, and 760.

For example, the first robot 780 may be assigned to bin 760, and may select the proper forehead pad 340. The robot 785 may be assigned to bin 720, and may select the proper side head pad 350. Likewise, the robot 790 may be assigned to bin 750, and may select the proper top head pad 330. The robots 780, 785, and 790 may assemble the protective equipment item 160 as it travels. Alternatively, the protective equipment item 160 may temporarily stop at a station near each robot 780, 785, and 790 for a duration of time and the robot 780, 785, and 790 may work to assemble the protective equipment item 160, and then the assembly line 710 may continue to move the protective equipment item 160 to the next such station upon completion. Any number of robots 780, 785, and 790 are contemplated. Further, any number of bins 720, 750, and 760 having any number of compartments 725, 755, and 765 for any number of pads 320, 330, 340, 350, 360, and 370 are contemplated.

Any kind of automated industrial assembly process and related devices are contemplated. In other exemplary embodiments of the present invention, human workers may place each of the pads 320, 330, 340, 350, 360, and 370 manually.

Figure 11:
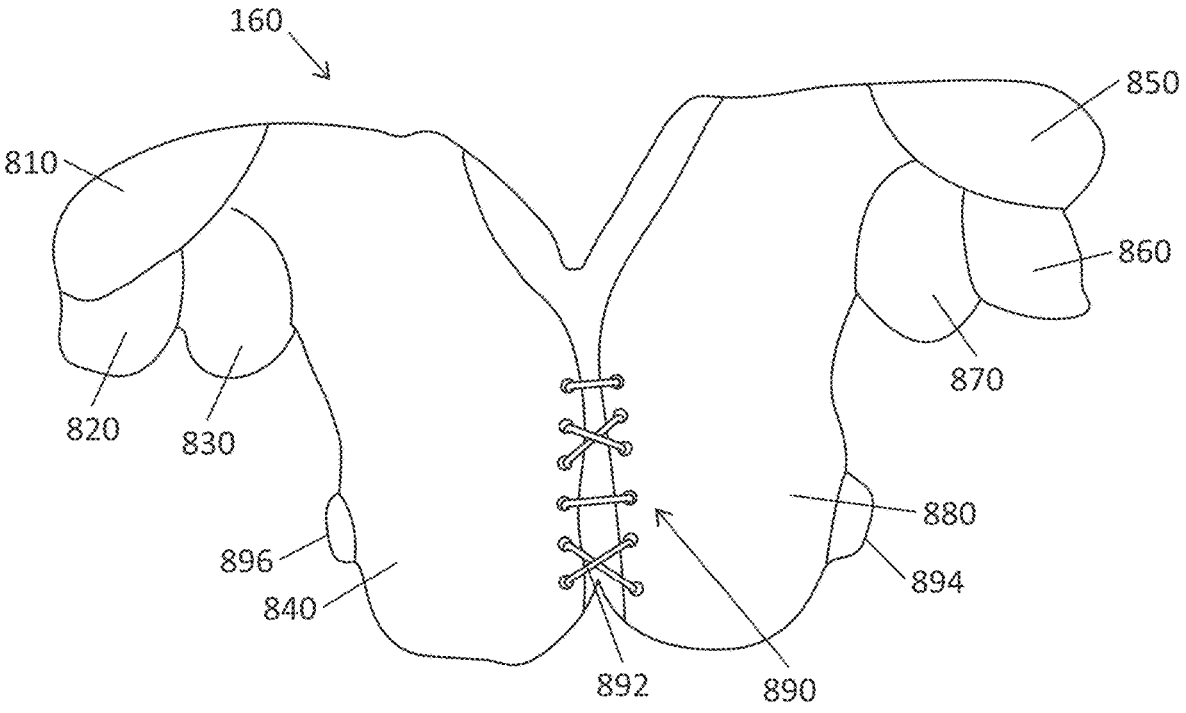
FIG. 11 illustrates a front view of another exemplary protective equipment item in the form of a shoulder pad, in accordance with an exemplary embodiment of the present invention.

FIG. 11 illustrates a front view of another exemplary protective equipment item 160 in the form of a shoulder pad assembly. As previously discussed, the present example is merely exemplary and should not be understood to be limiting. Any number, style, or type of pads for any number of applications and activities is contemplated.

Referring to FIG. 11, the shoulder pad assembly 160 may be comprised of a selection of predetermined or pre-manufactured or stock components, where each selected component: has a set of different physical dimensions, and is identified through a player-specific selection process. The pre-manufactured components include a right and left upper or first shoulder member or epaulet member 810 and 850. A left and right side or second shoulder member or cap member 820 and 860 may be affixed below the left and right upper or first shoulder member 810 and 850, respectively, and to left and right arch members 840, 880 (as discussed below). A right and left frontal or deltoid member 830 and 870 may additionally be affixed to the shoulder pad 160 proximate an outer edge of the arch member 840, 880, respectively, and be configured to cover the deltoid region of the user's body. Right and left arch members or arches 840 and 880 extend rearward from the shoulder over the user's back and forward over the user's chest, such that the arches 840, 880 overlie a substantial extent of the user's torso. The right and left arches 840, 880 of the shoulder pad 160 may be operatively joined at the front, back, and the sides by a connector 890, such as a lace 892, belt 894, elastic band 896, or the like. Each of the protective members 810, 850, 820, 860, 830, 870, 840, and 880 may be comprised of a rigid outer layer or shell, and a softer, flexible pad layer or pad element below, where the pad layer or element has a set of physical dimensions (e.g., thickness), as well as material properties, intended for absorption and management of impact forces.

Similar to previous examples discussed herein, a combination of pre-manufactured protective components or members such as 810, 850, 820, 860, 830, 870, 840, and 880 are identified and selected, via an algorithm, based upon the scanned anatomical data and measurements of the player. This player-specific selection of a best fitting combination of pre-manufactured components is utilized to assemble the protective equipment item 160. The "player-specific selection of pre-manufactured components" for the shoulder pad assembly 160 may be considered "personalized" or "customized" or a "custom selection" because it (a) involves selecting a particular set of pre-manufactured components from amongst a larger group of pre-manufactured components that have different predetermined dimensions and/or distinct configurations, and (b) is implemented on an individual basis amongst the various components that comprise the shoulder pad assembly 160, including amongst the arch members 840, 880, the cap members 820, 860, and the epaulet members 810, 850. This selection process is based upon analysis of the scan of the player's torso, such that the selected set of pre-manufactured, components best-fit or largely correspond to the anatomical data and measurements (e.g., size, contour and topography) of the player's body part or region (e.g., torso). However, the "player-specific selection of pre-manufactured components" does not involve designing or fabricating a set of custom sized and custom dimensioned components of the shoulder pad assembly 160. Thus, the "player-specific selection of pre-manufactured components" should not be considered a "bespoke" process because that involves the formation of custom dimensioned components that are specifically designed to precisely match the unique anatomical characteristics of the player's body or region. For example, but not to serve as a limitation, the "player-specific selection of pre-manufactured components" concept can be implemented when the user or player may have one shoulder that is slightly larger than the other, which then necessitates that the shoulder pad assembly 160 be assembled with a player-specific selection of pre-manufactured components that correspond to the player's larger shoulder. In that regard, the pad assembly 160 includes a player-specific or personalized selection of pre-manufactured components of different sizes: a large right upper member 810, a large right or second shoulder cap 820, a large right frontal member 830, and a large right arch 840 may be utilized with a medium left upper member 850, a medium left or second shoulder cap 860, a medium left frontal member 870, and a medium left arch 880. In another example, again without limitation, the user or player may have a weak or injured right shoulder that requires extra padding, in which case, a larger size upper member 810, a larger shoulder cap 820, a larger frontal member 830, and a right arch 840 and/or a member material having a greater thickness or different protective properties may be utilized above the injured or weak shoulder.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for creating a protective football shoulder pad to be worn by a football player, said system comprising:

a plurality of distinct types of fitting components, each provided in a plurality of distinct, predetermined dimensions, wherein the fitting components include: at least two arch members, each having a set of distinct, predetermined dimensions and at least two shoulder cap members, each having a set of distinct, predetermined dimensions;

an electronic scanning device to obtain a 3D scan of the player's torso, the 3D scan including anatomical data of the player's torso; and at least one computer in electronic communication with said scanning device, said at least one computer comprising at least one electronic storage device comprising software instructions, which when executed, configure at least one processor to:

receive and process the anatomical data of the player's torso;

evaluate said anatomical data against the distinct, predetermined dimensions of said arch members to identify which arch member from amongst said at least two arch members has distinct, predetermined dimensions that best fit the anatomical data, whereby the identified arch member can be subsequently used to form the protective football shoulder pad.

2. The system for creating a protective football shoulder pad of claim 1, the system further comprises one or more databases comprising one or more lookup tables associating each of the plurality of arch members with respective one or ones of the shoulder cap members, wherein the lookup tables include (i) dimension ranges for each of the at least two arch members, and (ii) dimension ranges for each of the at least two shoulder cap members.

3. The system for creating a protective football shoulder pad of claim 1, wherein a first arch member has a first set of distinct, predetermined dimensions and a second arch member with a second set of distinct, predetermined dimensions, and wherein the first set of distinct, predetermined dimensions are closer to the anatomical data than the second set of distinct, predetermined dimensions, whereby the first set of distinct, predetermined dimensions best fit the anatomical data.

4. The system for creating a protective football shoulder pad of claim 3, wherein the first set of distinct, predetermined dimensions correspond to a size of the first arch member, and the second first set of distinct, predetermined dimensions correspond to a size of the second arch member, wherein the second size is different than the first size.

5. The system for creating a protective football shoulder pad of claim 1, wherein each of said arch members include a rigid outer layer and a flexible inner pad layer.

6. The system for creating a protective football shoulder pad of claim 1, wherein each of said arch members comprises a separate rigid outer shell and a separate flexible inner pad member.

7. A method for creating a protective football shoulder pad to be worn by a football player, the method comprising:

providing a plurality of distinct types of pre-manufactured fitting components that include: a first arch member having a first set of distinct, predetermined dimensions, and a second arch member having a second set of distinct, predetermined dimensions;

using an electronic scanning device to obtain a 3D scan of the player's torso, the 3D scan including anatomical data of the player's torso;

providing at least one computer in electronic communication with said scanning device, said at least one computer comprising at least one electronic storage device comprising software instructions; and, executing the software instructions to configure at least one processor to:

receive and process the anatomical data from the 3D scan of the player's torso;

comparing said anatomical data against the first set of distinct, predetermined dimensions of the first arch member;

comparing said anatomical data against the second set of distinct, predetermined dimensions of the second arch member; and, identifying one of the first or second arch members for installation in the protective football shoulder pad based upon said comparison involves a best fit analysis between the anatomical data and the first and second set of distinct, predetermined dimensions.

8. The method for creating a protective football shoulder pad of claim 7, wherein the best fit analysis involves how closely the anatomical data corresponds to both the first set of distinct, predetermined dimensions of the first arch member and the second set of distinct, predetermined dimensions of the second arch member.

9. The method for creating a protective football shoulder pad of claim 7, the method further comprises:

providing the pre-manufactured fitting components that further include: a first shoulder cap member having a first set of distinct, predetermined dimensions, and a second shoulder cap member having a second set of distinct, predetermined dimensions;

executing the software instructions to configure at least one processor to:

compare said anatomical data against the first set of distinct, predetermined dimensions of the first shoulder cap member; and compare said anatomical data against the second set of distinct, predetermined dimensions of the second shoulder cap member; and, identifying one of the first or second shoulder cap members for installation in the protective football shoulder pad based upon said comparison involves a best fit analysis between the anatomical data and the first and second set of distinct, predetermined dimensions of the shoulder cap members.

10. The method for creating a protective football shoulder pad of claim 8, the method further providing one or more databases with one or more lookup tables associating each of the first and second arch members with each of the respective first and second shoulder cap members, wherein the lookup tables include (i) dimension ranges for each of the two arch members, and (ii) dimension ranges for each of the two shoulder cap members.

11. The method for creating a protective football shoulder pad of claim 7, wherein each of the first and second arch members include a rigid outer layer and a flexible inner pad layer.

12. The method for creating a protective football shoulder pad of claim 7, wherein each of the first and second arch members comprises a separate rigid outer shell and a separate flexible inner pad member.

13. A method for creating an American football helmet to be worn by a football player, the method comprising:

providing a plurality of pre-manufactured pad members to be installed within a helmet shell, the pre-manufactured pad members including: (i) at least two rear pad members, each having a set of distinct, predetermined dimensions and (ii) at least two front pad members, each having a set of distinct, predetermined dimensions;

using an electronic scanning device to obtain a 3D scan of the player's head, the 3D scan including anatomical data of the player's head;

providing at least one computer in electronic communication with said scanning device, said at least one computer comprising at least one electronic storage device comprising software instructions; and, executing the software instructions to configure at least one processor to:

receive and process the 3D scan of the player's head;

evaluate, using a best fit analysis, said anatomical data in the 3D scan against the distinct, predetermined dimensions of said rear pad members to identify which rear pad member from amongst the at least two rear pad members has distinct, predetermined dimensions that satisfy the best fit analysis, whereby the identified rear pad member can be subsequently installed within the helmet shell;

evaluate, using a best fit analysis, said anatomical data in the 3D scan against the distinct, predetermined dimensions of the front pad members to identify which front pad member from amongst the at least two front pad members has distinct, predetermined dimensions that satisfy the best fit analysis, whereby the identified front pad member can be subsequently installed within the helmet shell.

14. The method for creating a protective football helmet of claim 13, the method further comprises providing one or more databases with one or more lookup tables associating each of the plurality of rear pad members with respective one or ones of the front pad members, wherein the lookup tables include (i) dimension ranges for each of the at least two rear pad members, and (ii) dimension ranges for each of the at least two front pad members.

15. The method for creating a protective football helmet of claim 13, further providing the pre-manufactured pad members with at least two rear crown members, each having a set of distinct, predetermined dimensions and, wherein the processor evaluates, using a best fit analysis, said anatomical data against the distinct, predetermined dimensions of said crown pad members to identify which crown pad member has distinct, predetermined dimensions that satisfy the best fit analysis, whereby the identified crown pad member can be installed within the helmet shell.

16. The method for creating a protective football helmet of claim 13, further providing the pre-manufactured pad members with at least two side pad members, each having a set of distinct, predetermined dimensions and, wherein the processor evaluates said anatomical data against the distinct, predetermined dimensions of said side pad members to identify which side pad member has distinct, predetermined dimensions that satisfy the best fit analysis, whereby the identified side pad can be subsequently installed within the helmet shell.

17. The method for creating a protective football helmet of claim 13, wherein the best fit analysis involves determining how closely the anatomical data corresponds to both: the first and second sets of distinct, predetermined dimensions of the rear pad members, and the first and second sets of distinct, predetermined dimensions of the front pad members.

18. The method for creating a protective football helmet of claim 17, wherein the method further comprises installing both the identified rear pad member and the identified front pad member in the helmet shell; and wherein the helmet shell is selected from amongst a plurality of helmet shells, each having a set of distinct, predetermined dimensions.

19. The method for creating a protective football helmet of claim 18, wherein the method further comprises the processor evaluating said anatomical data against the distinct, predetermined dimensions of the plurality of helmet shells to identify which helmet shell from amongst the plurality of helmet shells has the distinct, predetermined dimensions that satisfy the best fit analysis, whereby the identified helmet shell receives the identified pad members during their installation.

20. The method for creating a protective football helmet of claim 13, wherein the identified rear pad member comprises a plurality of distinct rear pad elements.

21. The method for creating a protective football helmet of claim 13, wherein the identified front pad member comprises a plurality of distinct front pad elements.

22. The method for creating a protective football helmet of claim 17, wherein the identified rear pad member comprises a plurality of rear pad elements.

23. An American football shoulder pad assembly to be worn by a player engaged in football activities, the shoulder pad assembly comprising:

a left arch member having a set of distinct, predetermined dimensions that best fit anatomical data in a 3D scan of the player's torso obtained from an electronic scanning device, wherein the left arch member was selected from amongst other left arch members, and wherein the selected left arch member has a set of distinct, predetermined dimensions that best fit said anatomical data;

a right arch member operatively connected to the left arch member, the right arch member having a set of distinct, predetermined dimensions that correspond to said anatomical data, wherein the right arch member was selected from amongst other right arch members, and wherein the selected right arch member has a set of distinct, predetermined dimensions that best fit said anatomical data;

a left shoulder cap member operatively connected to the left arch member, the left shoulder cap member having a set of distinct, predetermined dimensions that best fit said anatomical data, wherein the left shoulder cap member was selected from amongst other left shoulder cap members, and wherein the selected left shoulder cap member has a set of distinct, predetermined dimensions that best fit said anatomical data; and, a right shoulder cap member operatively connected to the right arch member, the right shoulder cap member having a set of distinct, predetermined dimensions that best fit said anatomical data, wherein the right shoulder cap member was selected from amongst other right shoulder cap members, and wherein the selected right shoulder cap member has a set of distinct, predetermined dimensions that best fit said anatomical data.

24. The American football shoulder pad assembly of claim 23, wherein the selection of the left arch member was performed by at least one computer in electronic communication with said scanning device, wherein said at least one computer includes at least one electronic storage device comprising software instructions, which when executed, configure at least one processor to evaluate said anatomical data against the distinct, predetermined dimensions of said left arch members to identify which left arch member has the distinct, predetermined dimensions that best fit said anatomical data.

25. The American football shoulder pad assembly of claim 23, wherein the selection of the left shoulder cap member was performed by at least one computer in electronic communication with said scanning device, wherein said at least one computer includes at least one electronic storage device comprising software instructions, which when executed, configure at least one processor to evaluate said anatomical data against the distinct, predetermined dimensions of said left shoulder cap members to identify which left shoulder cap member has the distinct, predetermined dimensions that best fit said anatomical data.

26. The American football shoulder pad assembly of claim 23, wherein the best fit analysis involves how closely the anatomical data corresponds to each of: the first and second sets of distinct, predetermined dimensions of the left arch members, and the first and second sets of distinct, predetermined dimensions of the right arch members.

27. The American football shoulder pad assembly of claim 23, wherein each of the left and right arch members includes a rigid outer layer and a flexible inner pad layer.

28. The American football shoulder pad assembly of claim 23, wherein each of said left and right arch members comprises a rigid outer shell and a flexible inner pad member affixed to the rigid outer shell.

29. The American football shoulder pad assembly of claim 23, wherein each of said left and right shoulder cap members includes a rigid outer layer and a flexible inner pad layer.

30. The American football shoulder pad assembly of claim 23, wherein each of said left and right shoulder cap members comprises a rigid outer shell and a flexible inner pad member affixed to the rigid outer shell.

31. The American football shoulder pad assembly of claim 23, wherein each of the left arch members that were not selected has a set of distinct, predetermined dimensions that does not best fit said anatomical data; and, wherein each of the right arch members that were not selected has a set of distinct, predetermined dimensions that does not best fit said anatomical data.

* * * * *